(12) United States Patent
Salter et al.

(10) Patent No.: US 11,440,462 B1
(45) Date of Patent: Sep. 13, 2022

(54) LIFTGATE LIGHTING SYSTEM

(71) Applicant: Ford Global Technologies, LLC, Dearborn, MI (US)

(72) Inventors: Stuart C. Salter, White Lake, MI (US); Paul Kenneth Dellock, Northville, MI (US); Peter Phung, Windsor (CA); Clayton Benjamin Ford, Dearborn, MI (US); David M. Diamond, Canton, MI (US); Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/197,200

(22) Filed: Mar. 10, 2021

(51) Int. Cl.
| | |
|---|---|
| *B60Q 1/26* | (2006.01) |
| *B60J 5/10* | (2006.01) |
| *F21V 23/04* | (2006.01) |
| *B60Q 1/30* | (2006.01) |
| *B60Q 1/56* | (2006.01) |
| *B60Q 1/00* | (2006.01) |

(52) U.S. Cl.
CPC .......... *B60Q 1/2669* (2013.01); *B60J 5/103* (2013.01); *B60Q 1/0011* (2013.01); *B60Q 1/30* (2013.01); *B60Q 1/56* (2013.01); *F21V 23/0478* (2013.01)

(58) Field of Classification Search
CPC ...... B60Q 1/2669; B60Q 1/0011; B60Q 1/30; B60Q 1/56; B60J 5/103; F21V 23/0478
USPC ........................................ 362/464, 467, 501
See application file for complete search history.

(56) References Cited

U.S. PATENT DOCUMENTS

| | | | |
|---|---|---|---|
| 8,174,146 B2 | 5/2012 | Cheal et al. | |
| 8,237,557 B1 * | 8/2012 | Hertz ....................... | B60Q 7/02 340/468 |
| 8,838,333 B2 | 9/2014 | Cheal et al. | |
| 9,097,055 B2 | 8/2015 | Cheal et al. | |
| 9,308,802 B2 | 4/2016 | Warburton et al. | |
| 9,636,978 B2 | 5/2017 | Warburton et al. | |
| 9,676,258 B2 | 6/2017 | Warburton et al. | |
| 9,815,402 B1 | 11/2017 | Salter et al. | |
| 9,849,830 B1 * | 12/2017 | Salter ....................... | B60Q 3/30 |
| 9,909,347 B2 | 3/2018 | Warburton et al. | |
| 10,787,118 B2 | 9/2020 | Augusty | |
| 10,800,320 B2 | 10/2020 | Sobecki | |
| 2016/0001700 A1 * | 1/2016 | Salter ....................... | B60Q 3/30 362/543 |

(Continued)

FOREIGN PATENT DOCUMENTS

| | | |
|---|---|---|
| EP | 2674328 B1 | 6/2020 |
| JP | 2018034793 A | 3/2018 |

*Primary Examiner* — Laura K Tso
(74) *Attorney, Agent, or Firm* — Vichit Chea; Price Heneveld LLP

(57) ABSTRACT

A liftgate lighting system for a vehicle includes a liftgate assembly having a first liftgate panel and a second liftgate panel. Each of the first liftgate panel and the second liftgate panel is operable between an opened position and a closed position. The second liftgate panel has a proximal end and a distal end. A sensor proximate to the proximal end of the second liftgate panel. The sensor defines a sensor field. A lamp assembly is coupled to the second liftgate panel. A controller is communicatively coupled to the lamp assembly. The controller activates the lamp assembly and the lamp assembly directs light to a ground area proximate to the second liftgate panel when the lower liftgate panel is in the opened position.

20 Claims, 14 Drawing Sheets

(56) References Cited

U.S. PATENT DOCUMENTS

2019/0122056 A1* 4/2019 Tran .................. G01S 7/521

* cited by examiner

LIFTGATE LIGHTING SYSTEM

FIELD OF THE DISCLOSURE

The present disclosure generally relates to a lighting system. More specifically, the present disclosure relates to a lighting system for a vehicle liftgate.

BACKGROUND OF THE DISCLOSURE

Vehicles typically have multiple doors for accessing a cargo space and a passenger cabin. Generally, a side door may provide access to the passenger cabin and a rear door may provide access to the cargo space. Additionally, vehicles often have lights on a vehicle-reward portion of the vehicle.

SUMMARY OF THE DISCLOSURE

According to at least one aspect of the present disclosure, a liftgate lighting system for a vehicle includes a liftgate assembly operably coupled to a vehicle body. The liftgate assembly includes an upper liftgate panel and a lower liftgate panel proximate to the upper liftgate panel. Each of the upper liftgate panel and the lower liftgate panel is operable between an opened position and a closed position. A lamp assembly is coupled to the lower liftgate panel. The lamp assembly includes at least one light source. A sensor is coupled to the vehicle body proximate to the lower liftgate panel. The sensor defines a sensor field that extends under the lower liftgate panel when the lower liftgate panel is in the opened position. A controller is communicatively coupled to the lamp assembly and the sensor, wherein the controller activates the lamp assembly when the sensor detects an object within the sensor field and the lower liftgate panel is in the opened position.

According to another aspect of the present disclosure, a vehicle liftgate lighting system includes a liftgate assembly having an upper liftgate panel and a lower liftgate panel. The upper liftgate panel and the lower liftgate panel are each operable between an opened position and a closed position. A latch assembly is coupled to the lower liftgate panel and configured to selectively engage the upper liftgate panel. The latch assembly includes a shroud. A lamp assembly is coupled to the shroud. A controller is in communication with the lamp assembly. The controller activates the lamp assembly to direct light toward a ground area below the lower liftgate panel when the lower liftgate panel is in the opened position.

According to another aspect of the present disclosure, a liftgate lighting system for a vehicle includes a liftgate assembly having a first liftgate panel and a second liftgate panel. Each of the first liftgate panel and the second liftgate panel is operable between an opened position and a closed position. The second liftgate panel has a proximal end and a distal end. A sensor is proximate to the proximal end of the second liftgate panel. The sensor defines a sensor field. A lamp assembly is coupled to the second liftgate panel. A controller is communicatively coupled to the lamp assembly. The controller activates the lamp assembly and the lamp assembly directs light to a ground area proximate to the second liftgate panel when the lower liftgate panel is in the opened position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
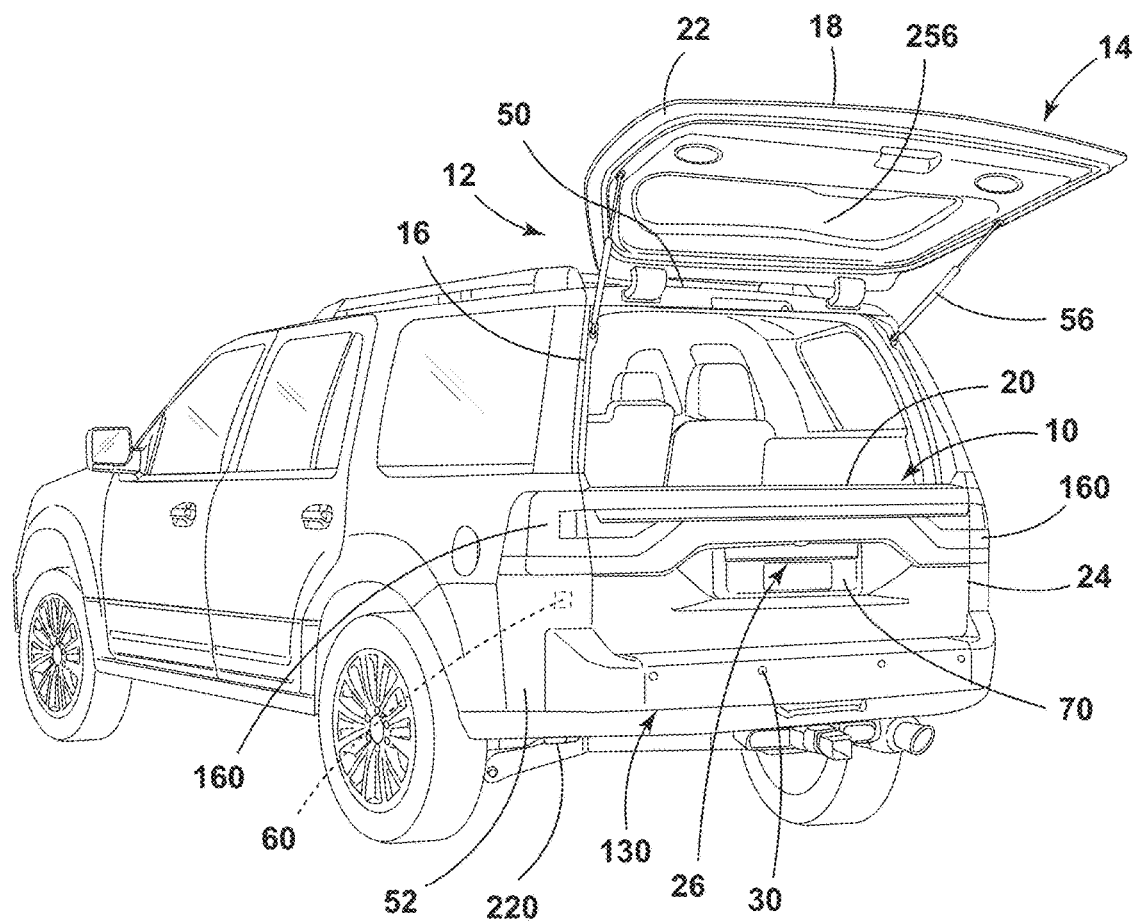
FIG. 1 is a rear perspective view of a vehicle having a split liftgate where an upper liftgate panel is opened, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-15, reference numeral 10 generally designates a liftgate lighting system for a vehicle 12. A liftgate assembly 14 is operably coupled to a vehicle body 16. The liftgate assembly 14 includes an upper liftgate panel 18 and a lower liftgate panel 20 proximate to the upper liftgate panel 18. Each of the upper liftgate panel 18 and the lower liftgate panel 20 is operable between an opened position 22 and a closed position 24. A lamp assembly 26 is coupled to the lower liftgate panel 20. The lamp assembly 26 includes at least one light source 28. A sensor 30 is coupled to the vehicle body 16 proximate to the lower liftgate panel 20. The sensor 30 defines a sensor field 32 that extends under the lower liftgate panel 20 when the lower liftgate panel 20 is in the opened position 22. A controller 34 is communicatively coupled to the lamp assembly 26 and the sensor 30. The controller 34 activates the lamp assembly 26 when the sensor 30 detects an object in the sensor field 32 and the lower liftgate panel 20 is in the opened position 22.

Figure 2:
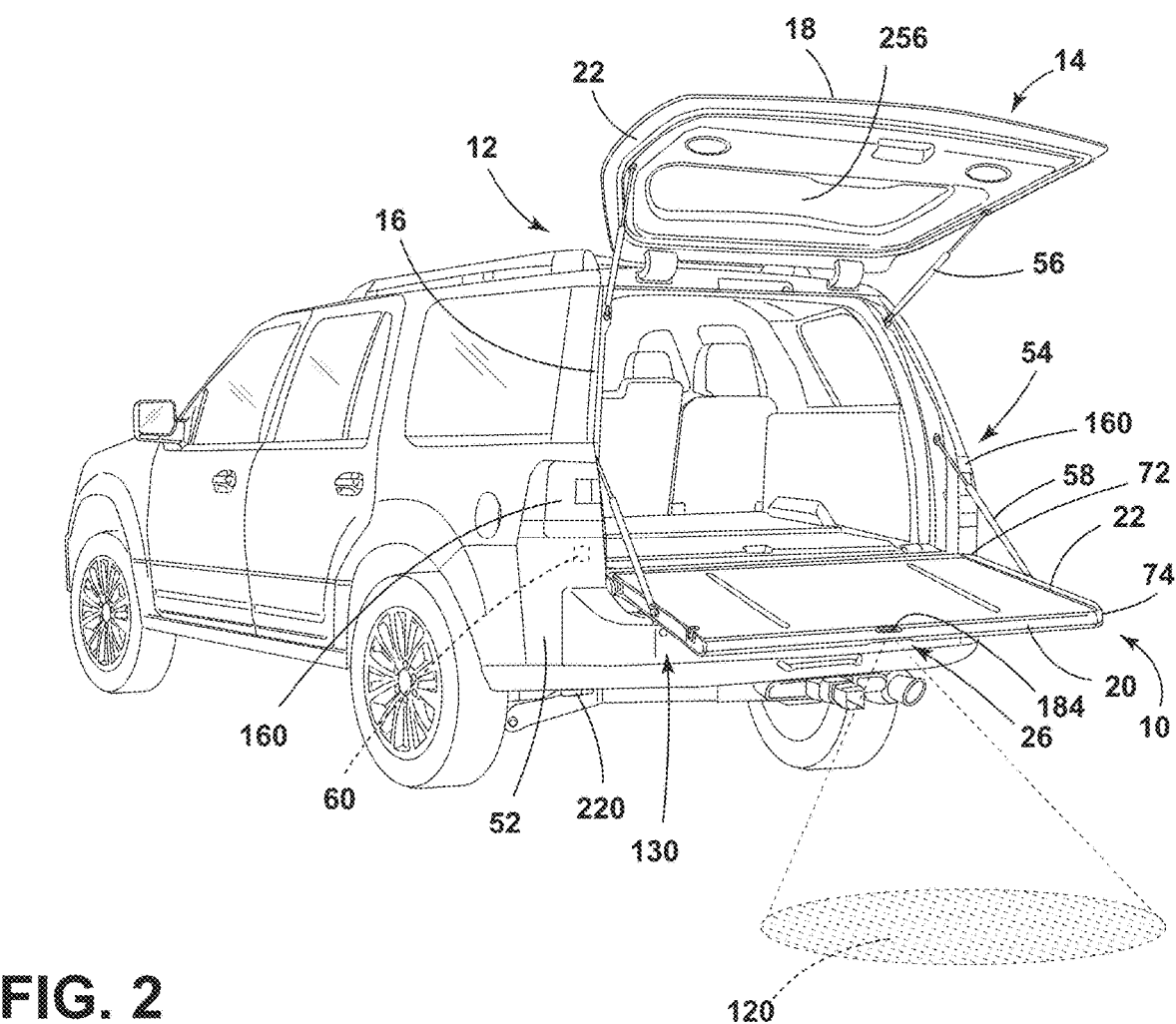
FIG. 2 is a rear perspective view of a vehicle having a split liftgate and a liftgate lighting system with both liftgate panels opened, according to the present disclosure.

Referring to FIGS. 1 and 2, the vehicle 12 includes a rear door, which is illustrated as the split liftgate assembly 14 including the upper liftgate panel 18 and the lower liftgate panel 20. The upper liftgate panel 18 is rotatably coupled to the vehicle body 16 proximate to a top 50 of the vehicle 12. The upper liftgate panel 18 is operable between the opened position 22, which is a raised position, and the closed position 24, which is a lowered position. The lower liftgate panel 20 is rotatably coupled to the vehicle body 16 proximate to a bumper 52. The lower liftgate panel 20 is operable between the opened position 22, which is a lowered position, and the closed position 24, which is a raised position. The upper and lower liftgate panels 18, 20 are independently operable between the opened and closed positions 22, 24, respectively. It is contemplated that the rear door may be configured as the illustrated split liftgate, a liftgate, a tailgate, or other doors without departing from the teachings herein.

The liftgate assembly 14 is configured as a powered door. The liftgate assembly 14 includes an actuation assembly 54 to automatically adjust the upper and lower liftgate panels 18, 20. Generally, the actuation assembly 54 includes an upper actuator 56 operably coupled to the upper liftgate panel 18 and a lower actuator 58 operably coupled to a lower liftgate panel 20.

The liftgate assembly 14 may also include a position sensor 60 that senses a position of the upper liftgate panel 18 and/or the lower liftgate panel 20. The controller 34 may utilize position information from the position sensor 60 to determine the position of the liftgate assembly 14. The controller 34 determines whether each of the upper and lower liftgate panels 18, 20 are fully closed, fully opened, or partially opened. Additionally or alternatively, a switch may be associated with the lower liftgate panel 20, which may indicate to the controller when the lower liftgate panel 20 is fully opened.

Referring still to FIGS. 1 and 2, the vehicle 12 is illustrated as a sport utility vehicle; however, the vehicle 12 may be a sedan, a truck, a van, a crossover, other wheeled motor vehicles 12, or other styles or types of vehicles 12. The vehicle 12 may be a manually operated vehicle 12 (e.g., operated with a human driver), a partially autonomous vehicle 12 (e.g., operated with or without a human driver), or a fully autonomous vehicle 12 (e.g., operated without a human driver). Additionally, the vehicle 12 may be utilized for personal or commercial purposes, such as transporting, ride-providing services (e.g., chauffeuring), or ride-sharing services.

Figure 3:
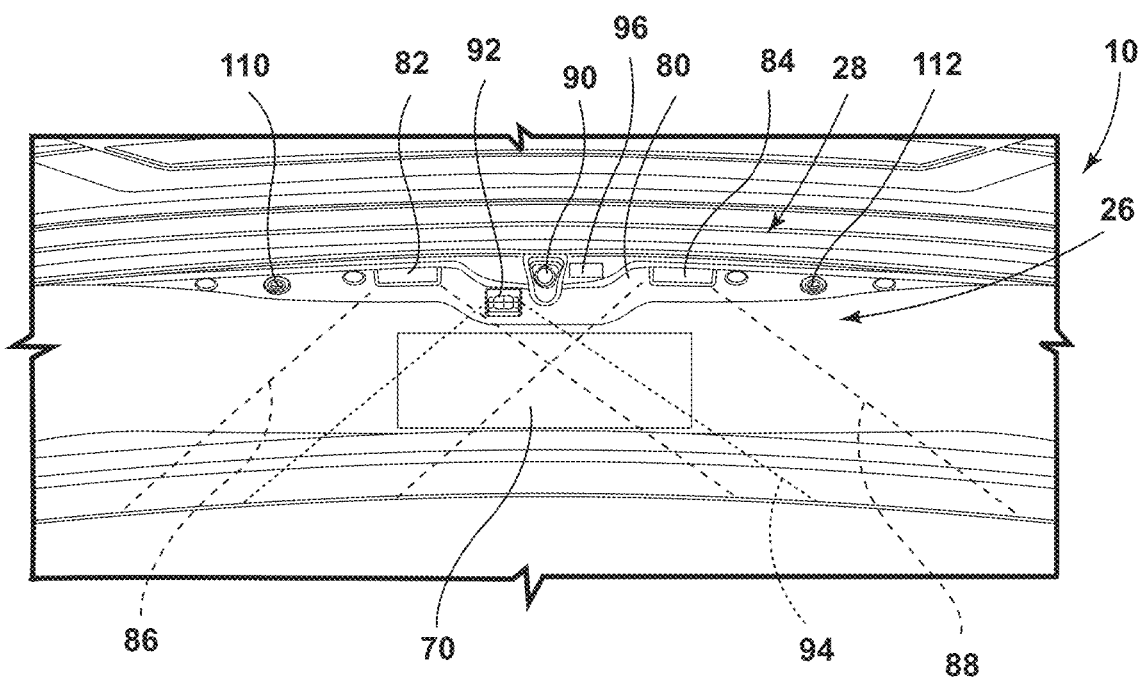
FIG. 3 is a front perspective view of a lamp assembly coupled to a liftgate, according to the present disclosure.

Referring still to FIG. 2, as well as FIG. 3, the liftgate lighting system 10 includes the lamp assembly 26 coupled to the lower liftgate panel 20. In the illustrated example, the lower liftgate panel 20 includes a license plate area 70 (e.g., the split in the liftgate assembly 14 is above the license plate area 70). Generally, the lower liftgate panel 20 includes a proximal end 72 operably coupled to the vehicle body 16 and a distal end 74 that is adjusted away from the vehicle body 16 when the lower liftgate panel 20 is adjusted to the opened position 22. The lamp assembly 26 is coupled to the lower liftgate panel 20 proximate license plate area 70. The lamp assembly 26 is disposed closer to the distal end 74 of the lower liftgate panel 20 compared to the license plate area 70. When the lower liftgate panel 20 is in the closed position 24, the lamp assembly 26 may direct light toward the license plate area 70 to illuminate a license plate coupled to the license plate area 70.

The lamp assembly 26 generally includes multiple light sources 28 that direct light to different areas on and/or proximate to the vehicle 12. The lamp assembly 26 includes a bracket 80 coupled to the lower liftgate panel 20, and the light sources 28 are generally coupled to the bracket 80. The lamp assembly 26 includes two license plate lights 82, 84. Each of the license plate lights 82, 84 emit light 86, 88, respectively, in overlapping patterns to illuminate the license plate area 70.

Referring still to FIGS. 2 and 3, an imager such as a rear camera 90 may be coupled to the bracket 80. The rear camera 90 may be advantageous for providing a backup camera or obtaining image data from any area rearward of the vehicle 12. The rear camera 90 is disposed between the license plate lights 82, 84.

The lamp assembly 26 may also include a backup assist light 92. The backup assist light 92 generally directs light 94 in a pattern that overlaps each of the patterns of light 86, 88 emitted by the license plate lights 82, 84. The backup assist light 92 illuminates the license plate area 70 and an area behind the vehicle 12. The backup assist light 92 generally illuminates a hitch area for assisting a user in engaging a trailer with the hitch. The backup assist light 92 may also be activated when the rear camera 90 is activated and the lower liftgate panel 20 is closed and/or when the vehicle 12 is in reverse. The backup assist light 92 is generally positioned between the rear camera 90 and the license plate light 82.

The lamp assembly 26 may also include a puddle light 96 coupled to the bracket 80 between the rear camera 90 and the license plate light 84. The puddle light 96 may remain deactivated when the lower liftgate panel 20 is in the closed position 24 and may be activated when the lower liftgate panel 20 is in the opened position 22. The puddle light 96 generally illuminates an area below the lower liftgate panel 20 when the lower liftgate panel 20 is in the opened position 22. The license plate lights 82, 84, the backup assist light 92, and the puddle light 96 may collectively be referred to as the light sources 28 of the lamp assembly 26. In conventional liftgates, lights utilized to illuminate a license plate generally include a shield that assists in directing light toward the license plate. In the present disclosure, the lower liftgate panel 20 may not include a shield or other shade protector, allowing for a greater illumination range of the lamp assembly 26.

As previously stated, the lower liftgate panel 20 may be part of a powered door. The bracket 80 may also include a user interface, which is illustrated as buttons 110, 112. The buttons 110, 112 may be utilized by the user to adjust a position of the upper and/or lower liftgate panels 18, 20.

Figure 4:
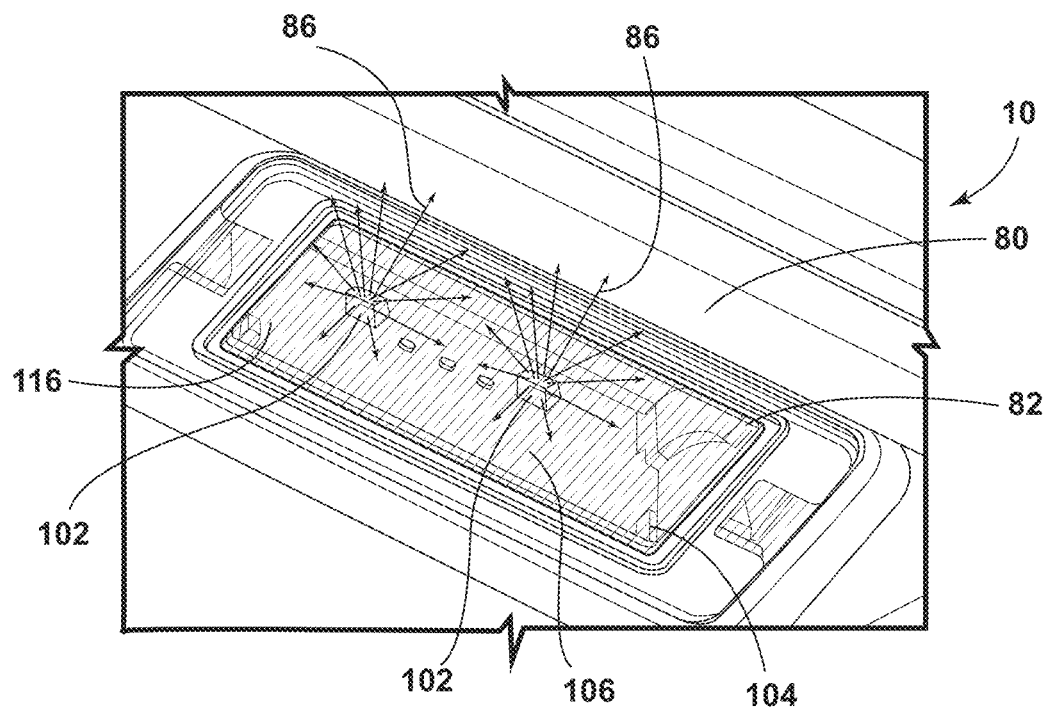
FIG. 4 is a front perspective view of a license plate light of a liftgate lighting system, according to the present disclosure.

Referring still to FIGS. 2 and 3, as well as FIG. 4, the light sources 28 of the lamp assembly 26 may be coupled to a circuit board 116. The circuit board 116 may be configured as one or more circuits or as a printed circuit board. The circuit board 116 may be configured as a flexible or rigid circuit board. In certain aspects, the light sources 28 of the lamp assembly 26 may be coupled to a Red, Green, and Blue (RGB) light-emitting diode (LED) board.

Referring still to FIG. 4, the license plate light 82 is illustrated. The license plate light 82 may include two lights 102, which may be bulbs or LEDs. The lights 102 direct the light 86 through a lens 104. In various examples, the lens 104 may define optics 106. The optics 106 defined by the lens 104 may be diffusing or widening optics 106, such as a TIR optic, which operate to widen the pattern of light 86 emitted by the license plate light 82. It is contemplated that the license plate light 84 may be similarly constructed.

Figure 5:
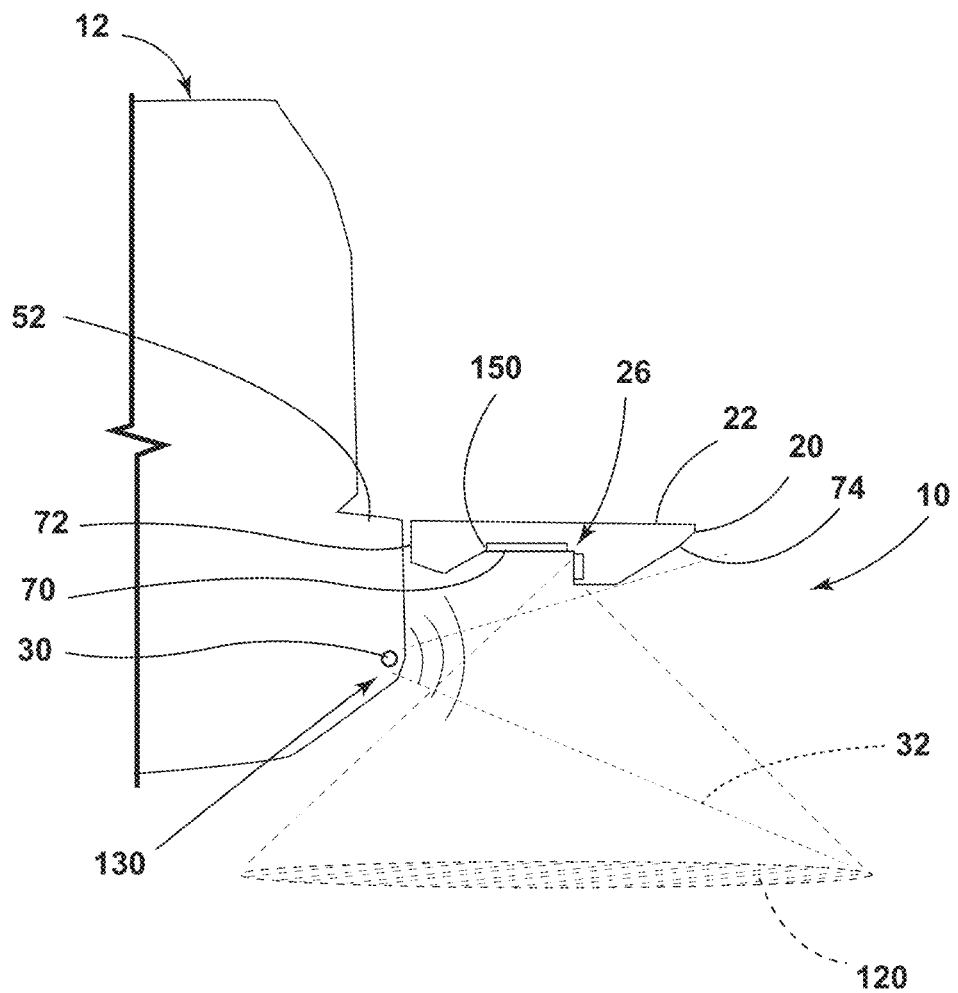
FIG. 5 is a schematic diagram of a liftgate lighting system illuminating a ground area and a sensor assembly, according to the present disclosure.

Referring to FIG. 5, the vehicle 12 includes a sensor assembly 130, which includes multiple sensors 30. The sensors 30 may be ultrasonic sensors or radar sensors. In radar sensor examples, the sensors 30 may include one or more radar chips to create an imaging radar. The sensor assembly 130 is generally coupled to the bumper 52 of the vehicle 12. The sensors 30 are arranged laterally across the vehicle 12 from a vehicle-right side to a vehicle-left side. Each sensor 30 defines the individual sensor field 32 that extends outwardly from the bumper 52. The sensor fields 32 extend from proximate to the proximal end 72 of the lower liftgate panel 20 toward the distal end 74. The sensor field 32 for each sensor 30 extends below the lower liftgate panel 20 when the lower liftgate panel 20 is in the opened position 22.

Figure 6:
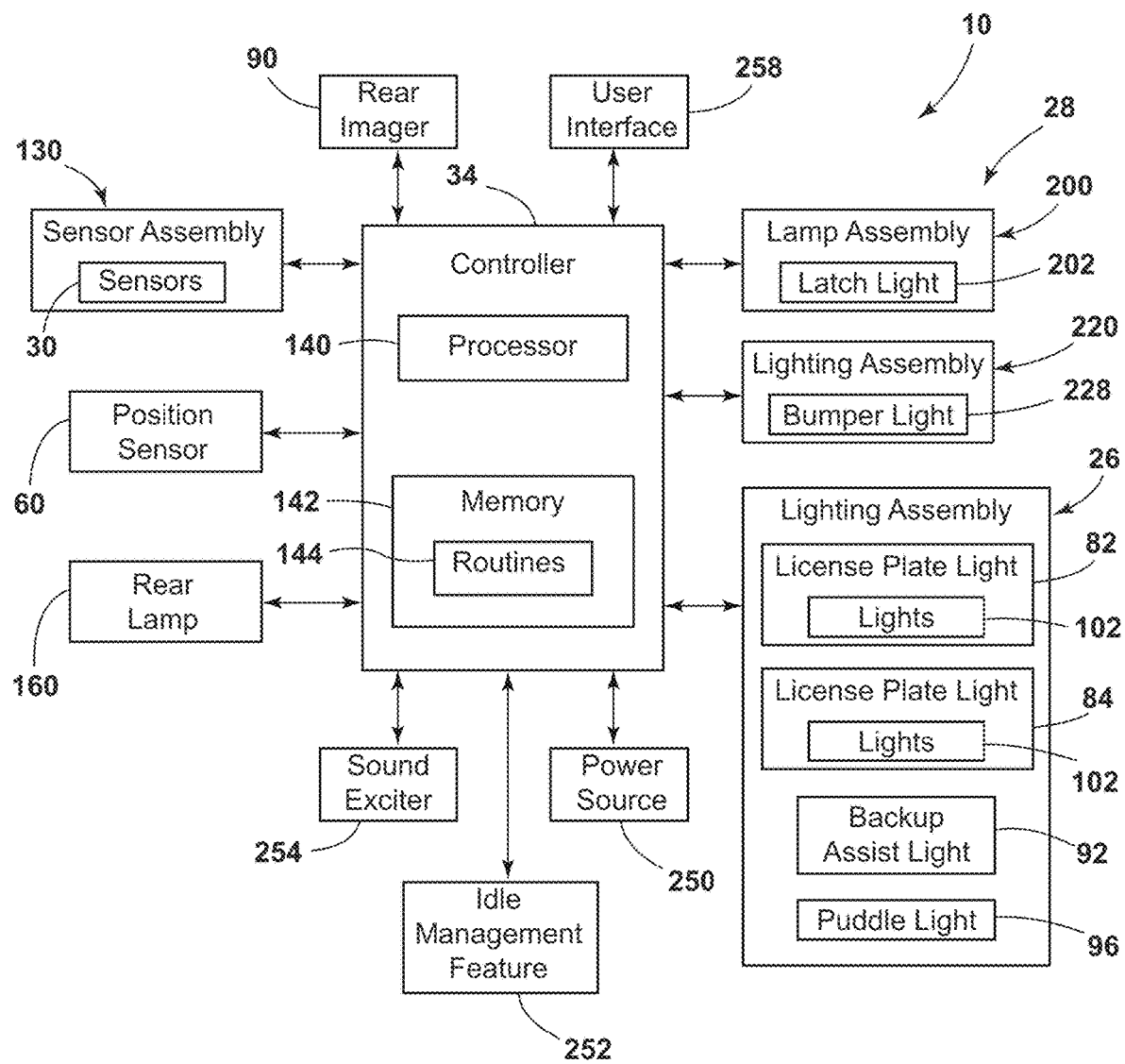
FIG. 6 is a block diagram of a liftgate lighting system, according to the present disclosure.

Referring still to FIG. 5, as well as FIG. 6, the controller 34 of the lighting system 10 includes a processor 140, a memory 142, and other control circuitry. Instructions or routines 144 are stored in the memory 142 and executable by the processor 140. The controller 34 may include various types of control circuitry, digital or analog, and may include the processor 140, microcontroller, an application specific integrated circuit (ASIC), or other circuitry configured to perform the various inputs or outputs, control, analysis, or other functions described herein. The memory 142 disclosed herein may be implemented in a variety of volatile and nonvolatile memory formats. The routines 144 may include operating instructions to enable the various methods described herein.

The controller 34 may activate the lamp assembly 26 to illuminate one or more of the light sources 28 under certain conditions. For example, when the lower liftgate panel 20 is in the closed position 24, the controller 34 may activate the license plate lights 82, 84 when the vehicle 12 is activated or in an "on" state. The license plate lights 82, 84 may then illuminate the license plate area 70. Additionally or alternatively, when the lower liftgate panel 20 is the closed position 24, the controller 34 may activate the backup assist light 92 when the rear camera 90 is activated, when the user is utilizing the hitch, or a combination thereof.

When the lower liftgate panel 20 is in the opened position 22, the controller 34 may activate the lamp assembly 26 to provide ambient lighting, illuminate the ground area 120 below the lower liftgate panel 20, and provide an indication that an object has been sensed by the sensor assembly 130. The controller 34 receives position information from the position sensor 60 and determines when the lower liftgate panel 20 is fully opened. To provide ambient lighting, the controller may activate the lamp assembly 26 to activate the license plate lights 82, 84, the backup assist light 92, and/or the puddle light 96 when the lower liftgate panel 20 is fully opened. Further, use of the puddle light 96 may illuminate the ground area 120 vertically below the opened lower liftgate panel 20.

Further, if an object is sensed within the sensor field 32 below the lower liftgate panel 20, the controller 34 activates or adjusts the intensity of light emitted from the light sources 28. For example, if the lamp assembly 26 is deactivated, the controller 34 may activate the lamp assembly 26 to illuminate the ground area 120, allowing the user to view the object. Additionally or alternatively, when the lamp assembly 26 is activated and the sensor assembly 130 senses an object, the controller 34 may increase the intensity of the light, indicating that an object was sensed and allowing the user to view the object.

In various examples, when providing ambient lighting, the light sources 28 of the lamp assembly 26 may operate at about a 20% duty cycle. When an object is detected by the sensor assembly 130, the controller 34 may increase the light intensity emitted from the lamp assembly 26 to a higher percentage such as, for example, 100%. The intensity may remain at the increased level for a predefined amount of time or until the object is no longer detected.

Figure 7:
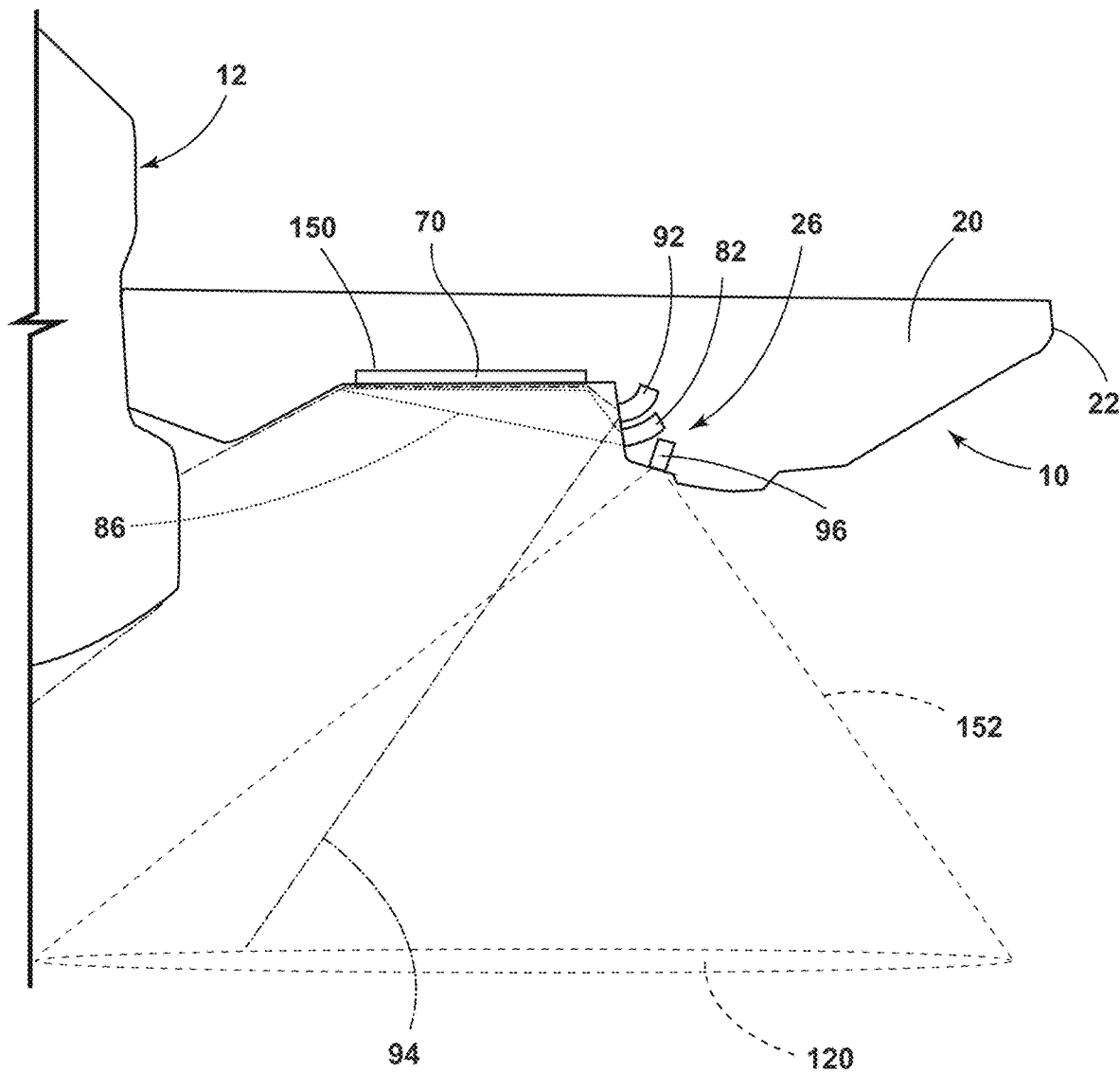
FIG. 7 is a schematic diagram of a vehicle lighting system illuminating multiple areas on a lower liftgate panel and a ground area proximate to a vehicle, according to the present disclosure.

Referring still to FIG. 6, as well as FIG. 7, each of the license plate lights 82, 84, the backup assist light 92, and the puddle light 96 provide a different pattern of light (e.g., emits light in a different direction) that increases the ambient lighting and/or the ground area 120 that is illuminated when the lower liftgate panel 20 is in the opened position 22. The lower liftgate panel 20 defines a recessed region 150, and the lamp assembly 26 is coupled to a side within the recessed region 150 proximate to the distal end 74. The license plate lights 82, 84 generally direct the light 86, 88 toward the license plate area 70 within the recessed region 150. The backup assist light 92 generally directs the light 94 to the license plate area 70 within the recessed region 150, as well as toward the ground area 120. The light 94 emitted by backup assist light 92 extends to an area further from the vehicle 12 compared to the light 86, 88 emitted by the license plate lights 82, 84. Further, the puddle light 96 emits light 152 vertically from the opened lower liftgate panel 20. The light 152 emitted by the puddle light 96 may overlap with the light 94 emitted by the backup assist light 92 and extend further from the vehicle 12 compared to the backup assist light 92.

Figure 8:
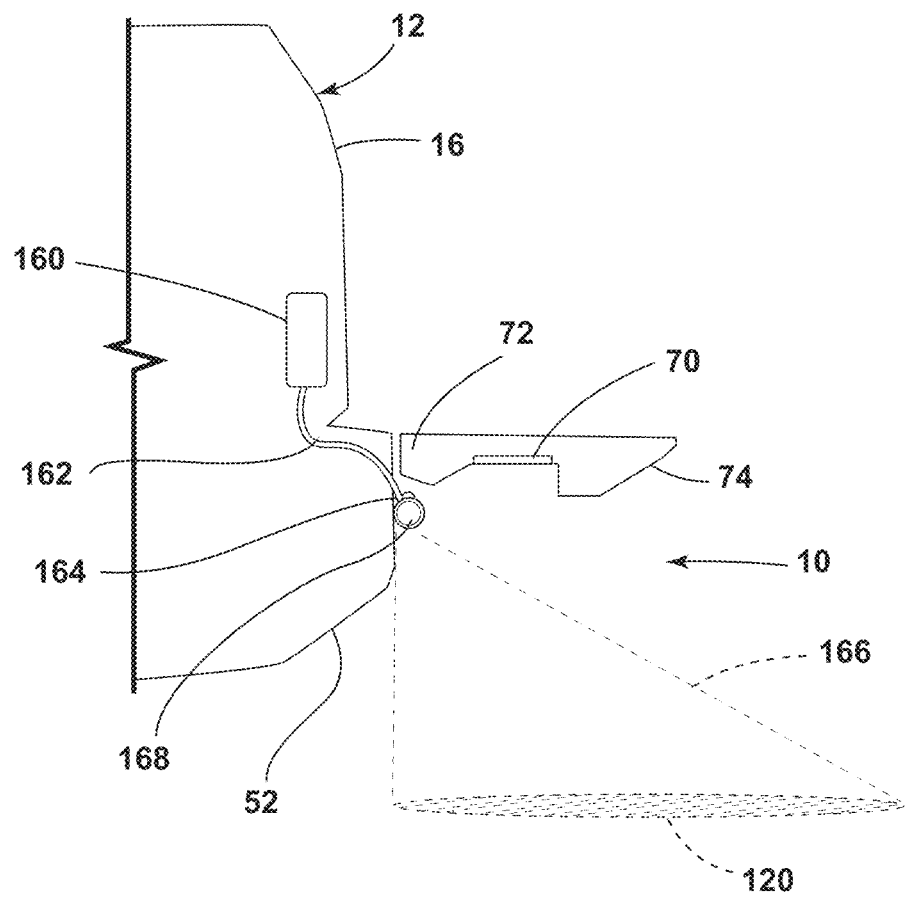
FIG. 8 is a schematic diagram of a liftgate lighting system illuminating a ground area with a rear lamp and a light guide, according to the present disclosure.

Referring to FIG. 8, in an additional or alternative configuration, the lighting system 10 may include a rear lamp 160. The rear lamp 160 is illustrated as a taillight but may be any light on a vehicle-rearward portion of the vehicle 12. Generally, the vehicle 12 includes two rear lamps 160, which may have the same configuration as the illustrated rear lamp 160 in FIG. 7. A light guide 162 extends from the rear lamp 160 to an aperture 164 in the vehicle body 16. When the lower liftgate panel 20 is in the opened position 22, the rear lamp 160 may be activated by the controller 34. Light 166 may be guided by the light guide 162 to the aperture 164, which is below the lower liftgate panel 20. The light guide 162 may be, for example, an optical fiber for directing light 166 from the rear lamp 160 to illuminate the ground area 120 below the lower liftgate assembly 14.

The rear lamp 160 may be associated with a secondary lamp 168 coupled to the vehicle body 16 and/or the bumper 52. The secondary lamp 168 may assist in directing the light 166 to the ground area 120. Additionally or alternatively, the secondary lamp 168 may include a lens and/or optics for diffusing the light 166. In examples with the secondary lamp 168, the secondary lamp 168 may be selectively coupled to the vehicle 12 and may be removable. It is contemplated that the rear lamp 160 may not be associated with the secondary lamp 168. In such examples, the light 166 may be directed to the ground area 120 from the light guide 162 proximate to the aperture 164.

Figure 9:
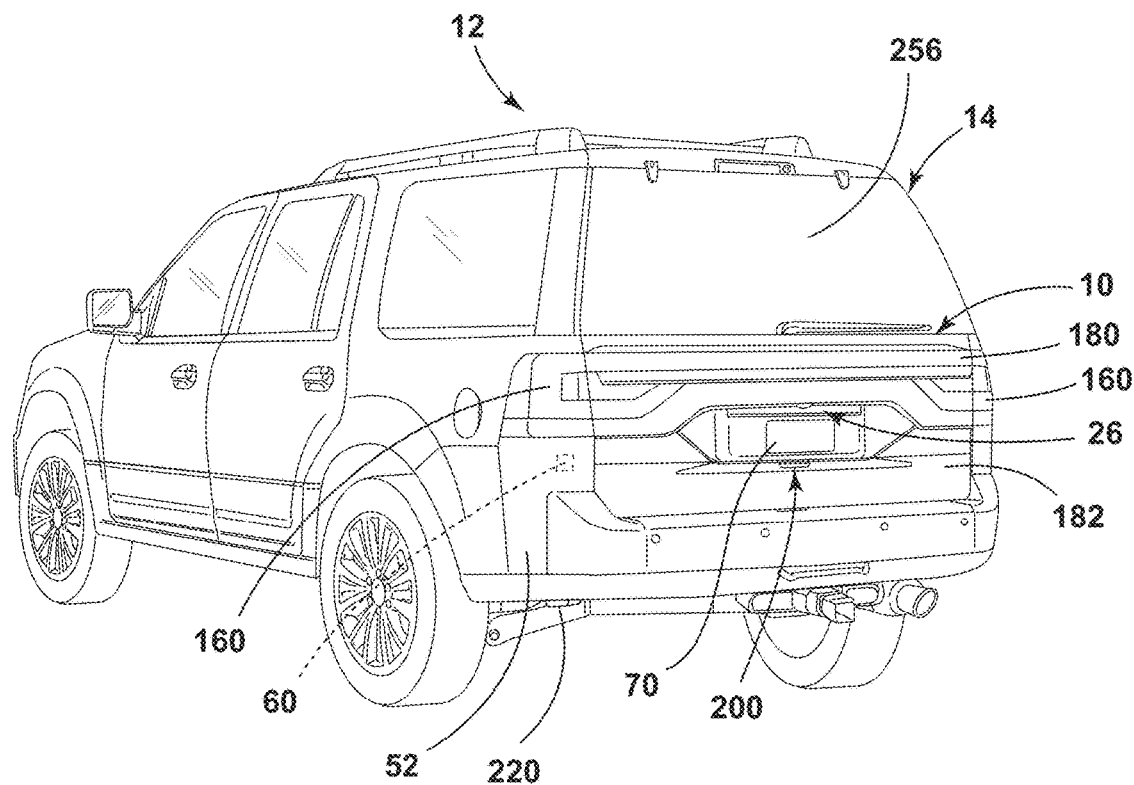
FIG. 9 is a rear perspective view of a vehicle having a split liftgate where the split liftgate is closed, according to the present disclosure.
Figure 10:
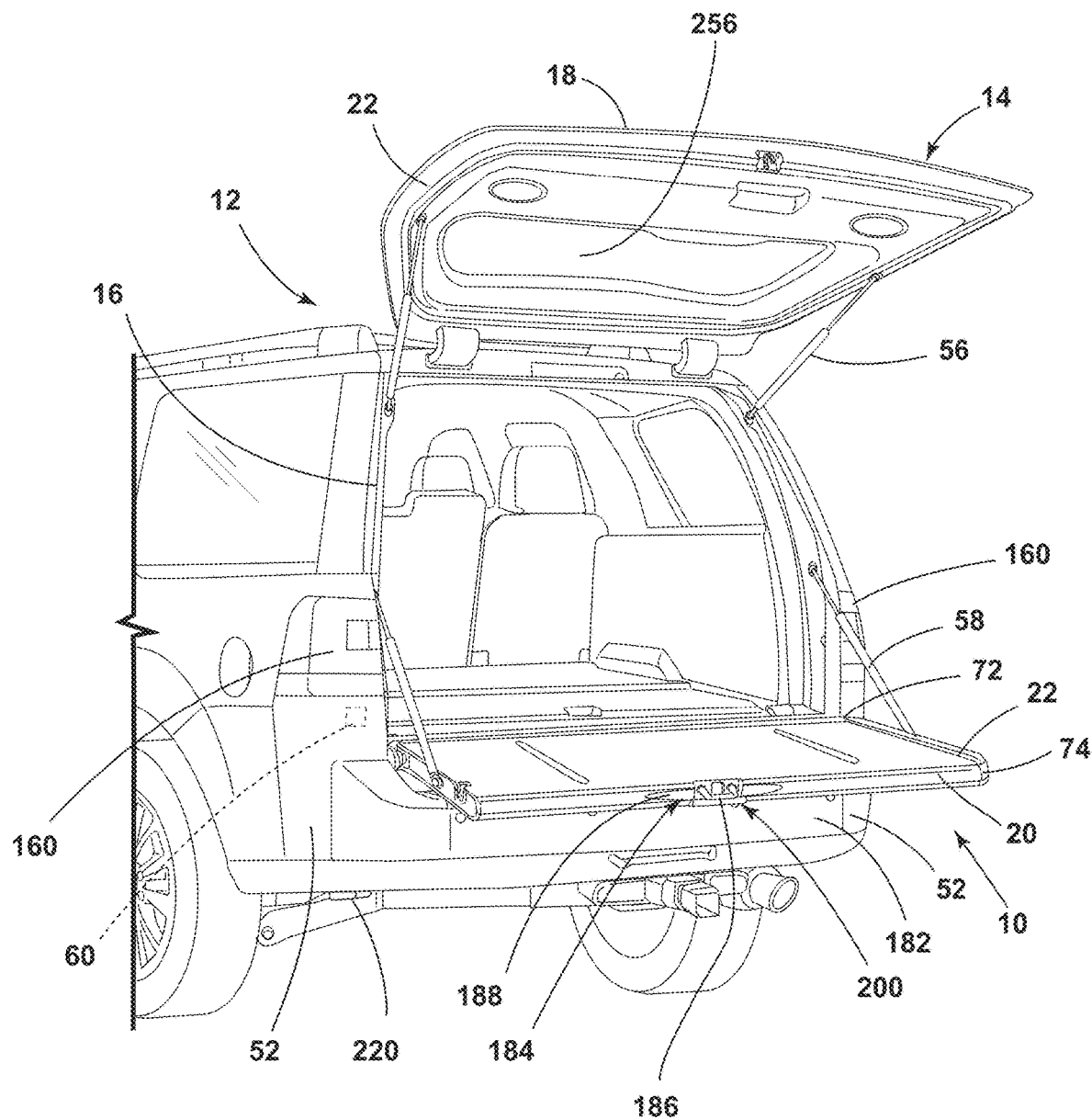
FIG. 10 is a rear perspective view of a vehicle having a split liftgate where the split liftgate is opened, according to the present disclosure.
Figure 11:
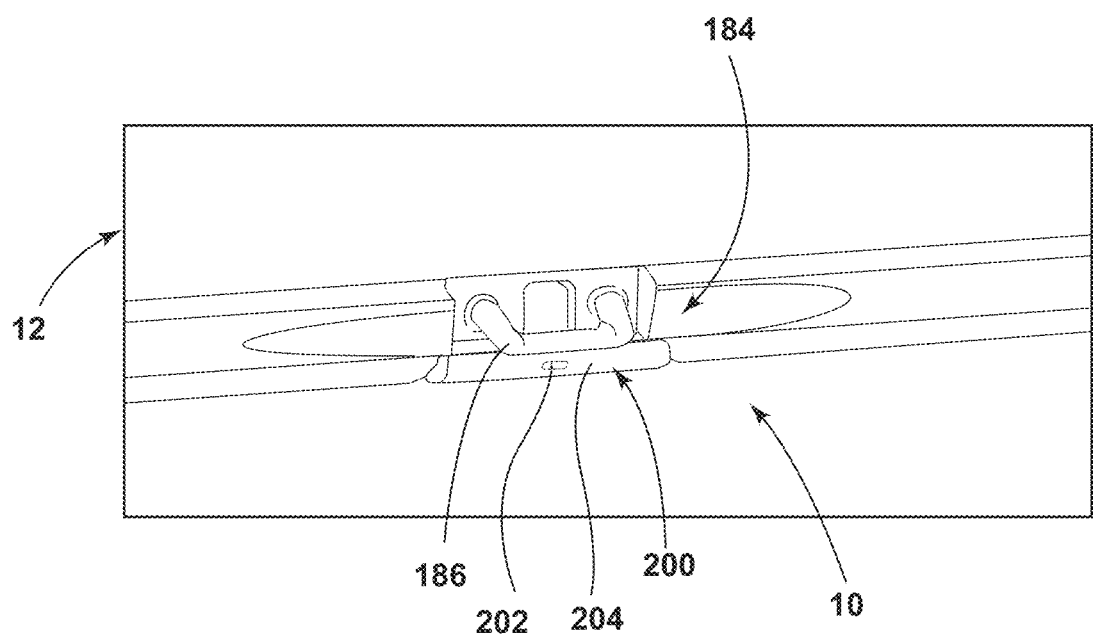
FIG. 11 is a front perspective view of a lamp assembly coupled to a latch on a lower liftgate panel, according to the present disclosure.

Referring to FIGS. 9-11, an additional or alternative configuration of the liftgate assembly 14 is illustrated. The liftgate assembly 14 may include an upper liftgate panel 180 and a lower liftgate panel 182. The upper and lower liftgate panels 180, 182 may be included in combination with or independently from the lamp assembly 26. In the illustrated example, the upper liftgate panel 180 includes the license plate area 70 (e.g., the split is below the license plate area 70). Therefore, the lamp assembly 26 having the license plate lights 82, 84 may not be utilized to illuminate the ground area 120 below the lower liftgate panel 182 when the liftgate assembly 14 is opened.

The lower liftgate panel 182 includes a latch assembly 184 for selectively securing the lower liftgate panel 182 to the upper liftgate panel 180. The latch assembly 184 includes a latch or striker 186 and a shroud 188. The lighting system 10 may include a lamp assembly 200 coupled to the shroud 188 proximate to the latch or striker 186. The lamp assembly 200 includes a latch light 202. A lens 204 may be coupled to the shroud 188 and it may include optics for diffusing or widening light 206 emitted from the latch light 202. It is contemplated that the liftgate assembly 14 having the upper and lower liftgate panels 18, 20 may additionally or alternatively include the lamp assembly 200 with the latch light 202 without departing from the teachings herein.

The lamp assembly 200 may have multiple latch lights 202. The latch lights 202 may be, for example, half-watt LEDs, which may be arranged in a string or may be separately and independently controlled by the controller 34. Each latch light 202 may direct light 206 (FIG. 12) through a same or similar type of optic. Alternatively, some or all of the latch lights 202 may direct the light 206 through different optics.

Figure 12:
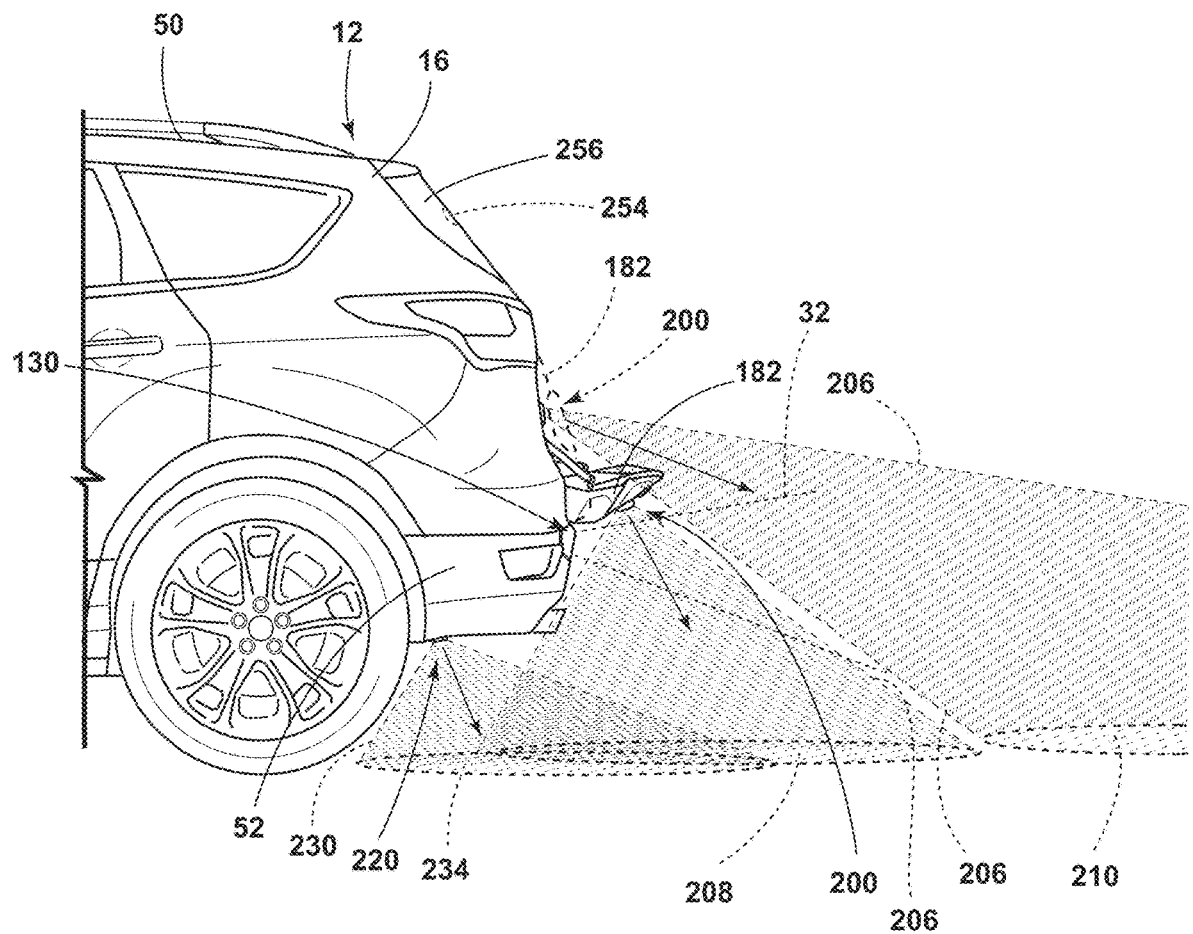
FIG. 12 is a side elevational view of a liftgate lighting system illuminating multiple ground areas proximate to a vehicle, according to the present disclosure.

Referring to FIG. 12, the lamp assembly 200 may direct the light 206 to two different ground areas 208, 210 based on the position of the lower liftgate panel 182. When the lower liftgate panel 182 is in the closed position 24 (illustrated in phantom), the lamp assembly 200 generally directs the light 206 to the ground region or ground area 210, which may be further from the vehicle 12 than the ground area 208. The light 206 emitted from the lamp assembly 200 when the lower liftgate panel 182 is in the closed position 24, may provide lighting for loading and unloading items in a cargo space of the vehicle 12. Additionally or alternatively, the lamp assembly 200 may provide a backup light and/or a puddle light when the lower liftgate panel 182 is in the closed position 24. The light 206 is emitted at a downward angle toward the ground area 210, which may correspond with being directed toward a lower body area of the user loading the cargo space. When the lamp assembly 200 is activated and the lower liftgate panel 182 is in the closed position 24, the intensity of the light 206 may be higher than when the lower liftgate panel 182 is in the opened position 22. For example, the intensity may be about 50% or greater.

When the lower liftgate panel 182 is in the opened position 22, the lamp assembly 200 directs the light 206 toward the ground area 208, which is generally closer to the vehicle 12 than the ground area 210 and extends below the opened lower liftgate panel 182. The light 206 may utilize ambient lighting, generally at a lower light intensity than when the lower liftgate panel 182 is closed. Further, similar to the lamp assembly 26 discussed herein, the lamp assembly 200 may be utilized in conjunction with the sensor assembly 130. When an object is sensed by the sensor assembly 130 and the lower liftgate panel 182 is in the opened position 22, the controller 34 may adjust the operation of the lamp assembly 200. If the lamp assembly 200 is deactivated and the object is sensed in the sensor field 32, the controller 34 may activate the lamp assembly 200. If the lamp assembly 200 is activated and the object is sensed in the sensor field 32, the intensity of the light 206 may be increased by the controller 34 for a predefined period of time or until the object is no longer detected. It is contemplated that the lamp assembly 200 may include additional latch lights 202 that are activated when the lower liftgate panel 182 is in the opened position 22. These additional latch lights 202 may direct light 206 through different optics for operating as a puddle lamp.

Figure 13:
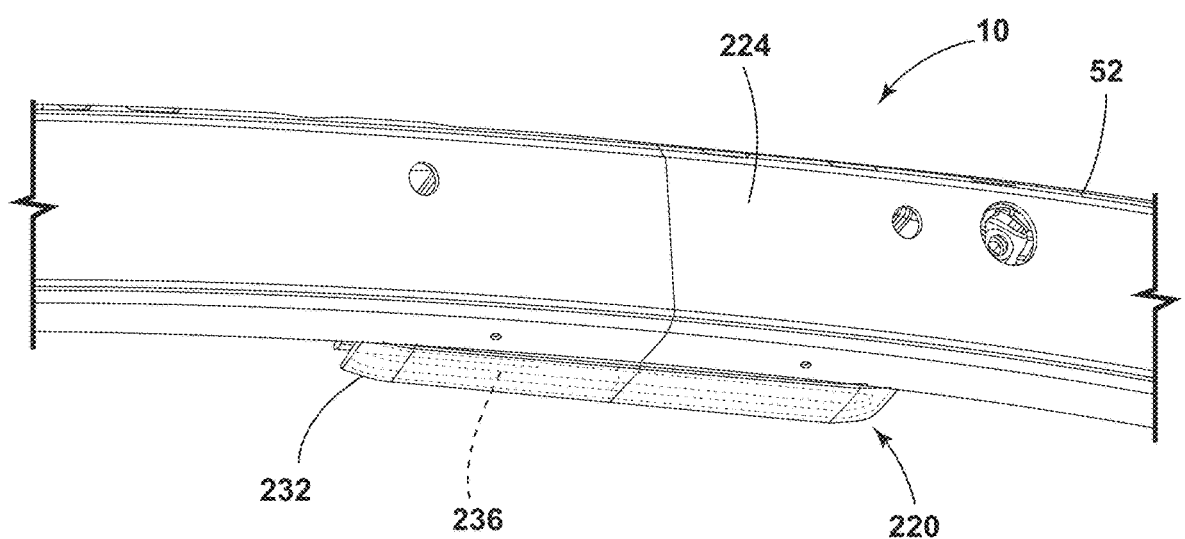
FIG. 13 is a front perspective view of a lighting assembly coupled to a bumper of a vehicle, according to the present disclosure.
Figure 14:
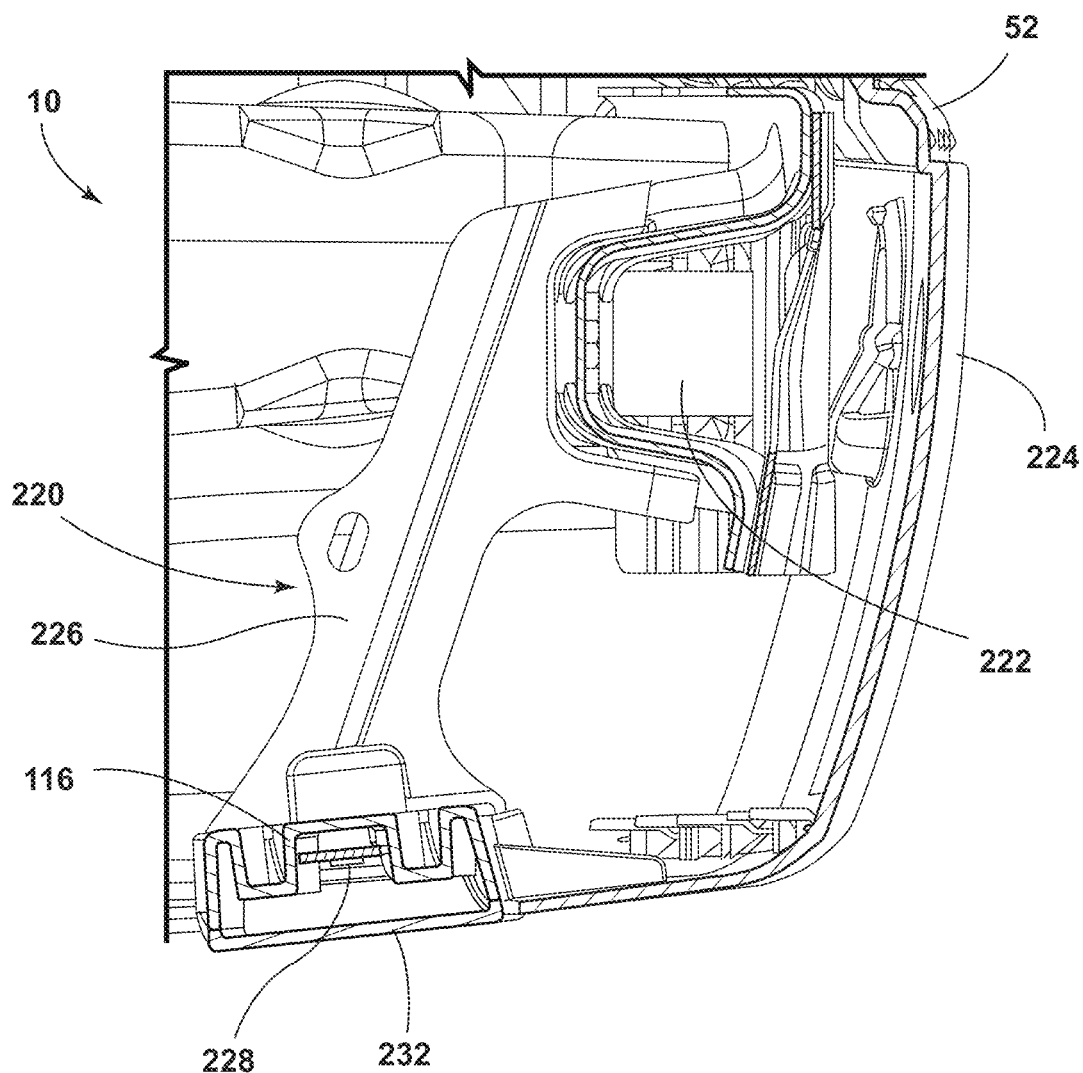
FIG. 14 is a cross-sectional view of a lighting assembly coupled to a bumper of a vehicle, according to the present disclosure.

Referring still to FIG. 12, as well as FIGS. 13 and 14, the lighting system 10 may include a lighting assembly 220, which may be used independently of or in combination with one or both of the lamp assembly 26 (FIG. 1), the rear lamp 160 (FIG. 8), and the lamp assembly 200. The lighting assembly 220 is coupled to the bumper 52 of the vehicle 12. Generally, the bumper 52 includes a bumper beam 222 and a bumper cover 224. The lighting assembly 220 includes a bracket 226 on the bumper beam 222. The bracket 226 engages the bumper beam 222 on opposing sides of the bumper beam 222 relative to the bumper cover 224 (e.g., within an interior of the bumper 52). The lighting assembly 220 includes a bumper light 228 that emits light 230 through a lens 232 proximate to a bottom of the bumper cover 224 and toward a ground area 234. Generally, the ground area 234 is disposed under the vehicle body 16 and may overlap with the ground area 208 selectively illuminated by the lamp assembly 200. The lens 232 may define an optic 236 for diffusing or widening the light 230 emitted by the lighting assembly 220. It is contemplated that the lighting assembly 220 may be deactivated while the vehicle 12 is in motion.

Referring FIGS. 1-14, the lighting system 10 may include any one or more of the lamp assembly 26, the lamp assembly 200, the rear lamp 160, and the lighting assembly 220. The license plate lights 82, 84, the backup assist light 92, the puddle light 96, the rear lamp 160, the latch light 202, and the bumper light 228 may collectively be referred to herein as the light sources 28 of the lighting system 10. The controller 34 may selectively and independently activate and adjust each light source 28. The controller 34 may determine the position of each panel of the liftgate assembly 14 (e.g., panels 18, 20 or panels 180, 182) and control the light sources 28 in response to the position information. Further, the controller 34 may activate or adjust the light sources 28 in response to the sensor assembly 130 sensing the object within the sensor field 32.

The lighting system 10 may be utilized for multiple purposes based on the position of the liftgate assembly 14. The lighting system 10 may illuminate an area under the liftgate assembly 14 that generally has lower visibility when the lower liftgate panel 20, 182 is in the opened position 22. Further, the lighting system 10 may be utilized to assist the user in locating the object or obstruction under the liftgate assembly 14 or the vehicle body 16. The lighting system 10 may be utilized for providing ambient lighting, as well as lighting for loading or unloading a cargo space and for utilizing the hitch.

Referring still to FIGS. 1-14, the lighting system 10 may operate in an ambient mode when providing the ambient lighting. In the ambient mode, the lighting system 10 may be activated for a predefined period of time when the lower liftgate panel 20, 182 is in the opened position 22 and then be deactivated. In certain aspects, the predefined period of time may be about one hour or any other practical time period. When in the ambient mode, the light sources 28 may operate a lower duty cycle to provide a softer or gentler glow of lighting and to conserve power. For example, when in the ambient mode, the light sources 28 may operate at about a 20% duty cycle. Additionally or alternatively, when the lower liftgate panel 20, 182 is in the opened position 22, the lighting system 10 may operate in a lingering condition, allowing for increased activation time compared to when the lower liftgate panel 20, 182 is in the closed position 24.

When the sensor assembly 130 senses an object or obstruction within at least one of the sensor fields 32, the controller 34 may increase the intensity of the light emitted by the lighting system 10 via pulse width modulation. The light sources 28 may operate at an increased duty cycle when the lower liftgate panel 20, 182 is opened and the object or obstruction is detected. The light intensity may be increased for a predefined period of time. In certain aspects, the intensity may be increased to 100% for about one minute. The light intensity and the predefined period of time may be adjusted. Additionally or alternatively, the light sources 28 may operate at increased intensity until the object is no longer detected.

The lighting may be adjusted as the lower liftgate panel 20, 182 is moving between the opened and closed positions 22, 24. For example, the light emitted by the lighting system 10 may increase as the lower liftgate panel 20, 182 is adjusted from the closed position 24 to the opened position 22. The lighting may not be activated until the lower liftgate panel 20, 182 reaches a predefined position or angle, for example, about three inches from the closed position 24. This may allow the light (e.g., 86, 88, 94, 152, 166, 206, 230) to be directed more to the ground area (e.g., 120, 208, 210, 234). Further, the lighting may decrease as the lower liftgate panel 20, 182 is adjusted from the opened position 22 to the closed position 24. When closing, the lighting system 10 may be deactivated prior to the lower liftgate panel 20, 180 being fully closed (e.g., when at a predefined position or angle).

The lighting system 10 may operate differently when the lower liftgate panel 20, 182 is in the closed position 24. When the lower liftgate panel 20, 182 is closed and the upper liftgate panel 18, 180 is opened, the lighting system 10 may provide a loading, puddle, or supplemental backup light. The lighting system 10 may operate at increased intensity, such as, for example, a maximum intensity to provide lighting for the user proximate to the rear of the vehicle 12.

Each of the light sources 28 disclosed herein may emit visible light that has a wavelength in a range of from about 380 nm to about 700 nm. The light sources 28 may include any form of light source, such as, for example, fluorescent lighting, LEDs, organic LEDs (OLEDs), polymer LEDs (PLEDs), laser diodes, quantum dot LEDs (QD-LEDs), solid-state lighting, a hybrid, and/or any other similar device. Any other form of lighting may be utilized in the lighting system 10 without departing from the teachings herein. Further, various types of LEDs are suitable for use as the light sources 28, including, but not limited to top-emitting LEDs, side-emitting LEDs, and others. Moreover, according to various examples, multicolored light sources such as RGB LEDs that may employ red, green, blue LED packaging may be used to generate various desired colors of light outputs from a single light source, according to known light color mixing techniques.

Each light source 28 may draw between about 30 mA and about 90 mA when activated. The amperage is generally low enough to be utilized while the vehicle 12 is deactivated or in an "off" state. The lighting system 10 is generally powered by a power source 250, for example, a vehicle battery or a designated battery. The controller 34 of the lighting system 10 is in communication with an idle management feature 252. When a state of charge of the power source 250 decreases to a predefined charge level or a change in the state of charge is within a predefined change range, the controller 34 may activate the idle management feature 252 to power or charge the power source 250. In certain aspects, when the state of charge of the power source 250 decreases by at least 10%, the idle management feature 252 may be activated or engaged to charge the power source 250 utilizing the vehicle engine. The controller 34 may utilize and/or be in communication with both a battery cycling model and a battery management sensor to monitor the charge level of the power source 250. Additionally or alternatively, in electric vehicle 12 examples, the power source 250 may be charged using a high voltage to low voltage converter. When the idle management feature 252 is activated, the controller 34 may activate a sound exciter 254 to emit an alert or notification to the user that the power source 250 is at a low charge level and, consequently, that the idle management feature 252 has been activated. The sound exciter 254 may be coupled to the vehicle body 16 or, for example, a rear window 256 of the liftgate assembly 14.

In various examples, the controller 34 is in communication with a user interface 258, which may be utilized to activate the lighting system 10. Additionally or alternatively, the lighting system 10 may automatically activate based on the position of the liftgate assembly 14. The type of lighting (e.g., ambient, loading, etc.) may be determined based on the configuration of the liftgate assembly 14, the position of the lower liftgate panel 20, 180, an input received by the user interface 258, or a combination thereof.

Figure 15:
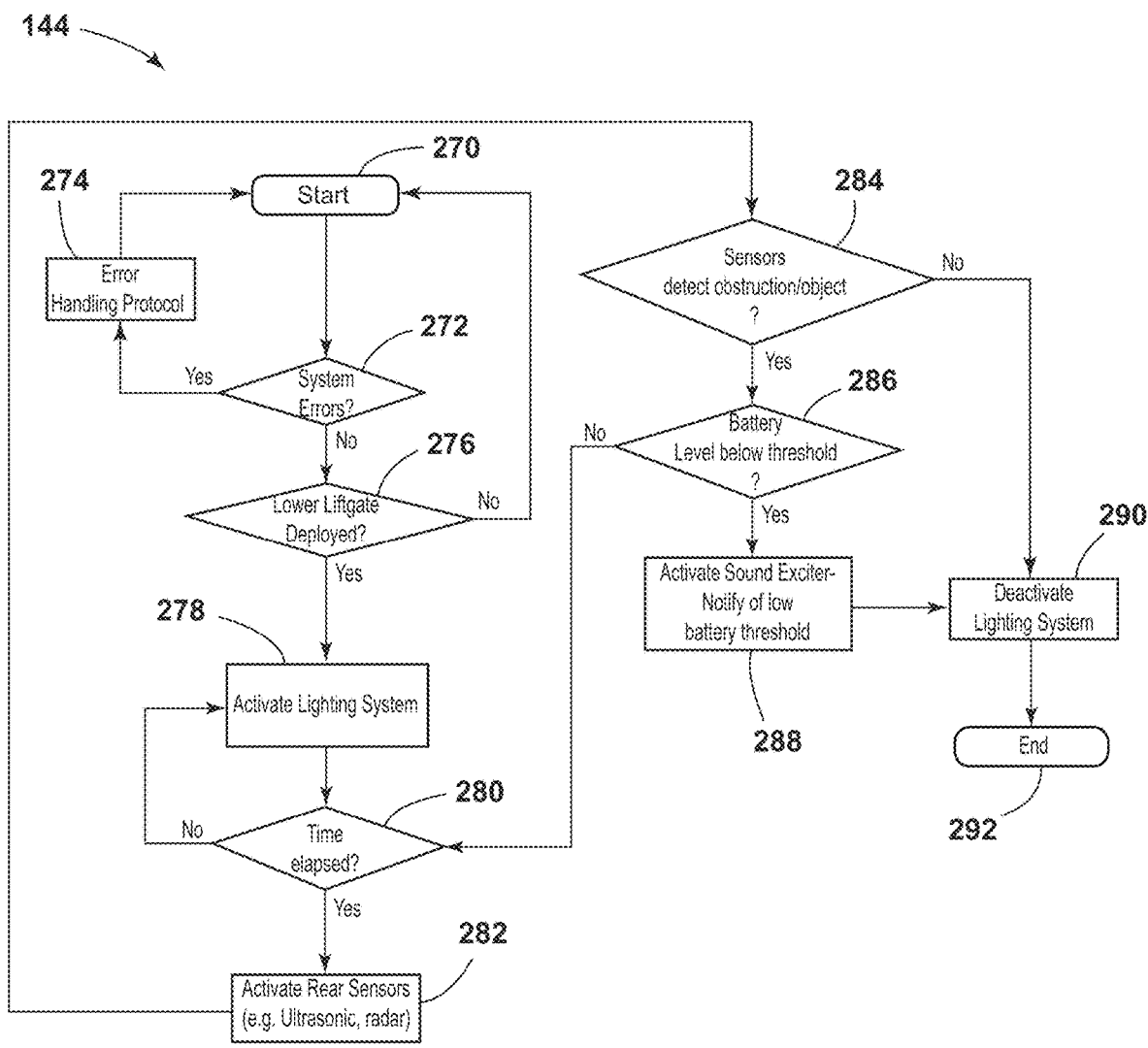
FIG. 15 is a flow diagram of a method of controlling a liftgate lighting system, according to the present disclosure.

Referring to FIG. 15, as well as FIGS. 1-14, the controller 34 includes at least one routine 144 directed to controlling the lighting system 10. The controller begins at a start 270 and proceeds to decision step 272 to determine if there are any system errors in the lighting system 10. If there are any system errors, the controller 34 proceeds to step 274 where an additional routine 144 may be activated to correct the error. Once the additional routine 144 has been completed in step 274, the controller 34 returns to the start 270.

Returning to decision step 272, if there are no detected errors, the controller 34 proceeds to decision step 276 to determine whether the lower liftgate panel 20, 182 is opened. The controller 34 may determine whether the lower liftgate panel 20, 182 is partially opened or fully opened. If the lower liftgate panel 20, 182 is not open, the controller 34 returns to the start 270. Returning to decision step 276, if the lower liftgate panel 20, 182 is opened, the controller 34 proceeds to step 278 of activating the lighting system 10. Activation may include activating any one or more of the lamp assembly 26, the rear lamp 160, the lamp assembly 200, and the lighting assembly 220. Each light source 28 or some light sources 28 of the lighting system 10 may be activated. The activation may be in accordance with a predefined setting, based on the position of the liftgate assembly 14, and/or based on an input received from the user interface 258.

Once the lighting system 10 is activated, the controller 34 proceeds to decision step 280 to determine whether a predefined period of time has elapsed. In certain aspects, the predefined period of time may be about ten minutes, but may any practicable period of time. If the predefined period of time has not elapsed, the controller 34 returns to step 278.

Returning to decision step 280, if the predefined period of time has elapsed, the controller 34 proceeds to step 282 of activating the sensor assembly 130. Once the sensor assembly 130 is activated, the controller 34 proceeds to decision step 284 to determine whether the sensor assembly 130 detects any obstructions or objects above a calibrated threshold. The calibrated threshold may be stored in the controller 34. Additionally or alternatively, the calibrated threshold may be preset during manufacturing and/or may be adjusted via the user interface 258. The calibrated threshold may assist in conserving energy utilized by the lighting system 10 and may assist in reducing a number and type of objects detected by the sensor assembly 130. Further, in step decision 284, if the sensor assembly 130 detects the object, the controller 34 may activate or adjust the lighting system 10 to emit light at a higher intensity.

In decision step 284, if the sensor assembly 130 detects the object, the controller 34 may proceed to decision step 286 to determine whether the power source 250 has an energy level below a predefined charge level. If the controller 34 determines that the power source 250 is above the predefined charge level, the controller 34 returns to decision step 280. Returning to decision step 286, if the power source 250 is below the predefined charge level, the controller 34 proceeds to step 288 to activate the sound exciter 254 to notify the user of the low charge level. After emitting the notification, the controller 34 proceeds to step 290 of deactivating the lighting system 10. In step 290, the controller 34 may adjust the lighting system 10 to dim the light emitted from the lighting system 10 to conserve the remaining charge level prior to deactivating.

Returning to decision step 284, if the sensor assembly 130 does not detect the object above the calibrated threshold, the controller 34 may proceed to step 290 deactivating the lighting system 10. Alternatively, in step 290, the lighting system 10 may lower the intensity of light emitted by the lighting system 10 or may continue to operate in an ambient lighting mode for a predefined period of time before deactivating. The controller 34 then proceeds to an end 292. It will be understood that the steps of the routine 144 may be performed in any order, simultaneously, and/or omitted without departing from the teachings provided herein.

Use of the present device may provide for a variety of advantages. For example, the lighting system 10 may be utilized to illuminate various ground areas 120, 208, 210, 234 with the various light sources 28. Also, the lighting system 10 may illuminate an area beneath the lower liftgate panel 20, 182 when the lower liftgate panel 20, 182 in the opened position 22. Additionally, the lighting system 10 may provide for ambient lighting, as well as to provide light for loading items into the cargo space. Further, the lighting system 10 may include the sensor assembly 130 to sense objects within the area below the liftgate assembly 14. Also, the controller 34 may adjust the lighting system 10 in response to the object being sensed within the sensor assembly 130. Additional benefits and advantages may be realized and/or achieved.

According to various examples, a liftgate lighting system for a vehicle includes a liftgate assembly operably coupled to a vehicle body. The liftgate assembly includes an upper liftgate panel and a lower liftgate panel proximate to the upper liftgate panel. Each of the upper liftgate panel and the lower liftgate panel is operable between an opened position and a closed position. A lamp assembly is coupled to the lower liftgate panel. The lamp assembly includes at least one light source. A sensor is coupled to the vehicle body proximate to the lower liftgate panel. The sensor defines a sensor field that extends under the lower liftgate panel when the lower liftgate panel is in the opened position. A controller is communicatively coupled to the lamp assembly and the sensor, wherein the controller activates the lamp assembly when the sensor detects an object within the sensor field and the lower liftgate panel is in the opened position. Embodiments of the present disclosure may include one or a combination of the following features:

at least one light source includes a license plate light that directs light to a license plate area, wherein the at least one light source also includes a backup assist light that directs light to at least one of the license plate area and a ground area proximate said the vehicle;

at least one light source further includes a puddle light that directs light to the ground area proximate to the liftgate assembly when the lower liftgate panel is in the opened position;

a lamp assembly includes a widening optic, wherein a light pattern emitted from the license plate light is widened by the widening optic;

a rear lamp coupled to a vehicle body proximate to the liftgate assembly, wherein a light guide extends from the rear lamp to an aperture in the vehicle body proximate to the lower liftgate panel to direct light to a ground area proximate to said vehicle; and a bumper cover coupled to the vehicle body proximate to the lower liftgate panel, a bracket, and a bumper light, wherein the bracket is coupled to the bumper cover, and wherein the bumper light directs light from proximate a bottom of the bumper cover.

According to various examples, a vehicle liftgate lighting system includes a liftgate assembly having an upper liftgate panel and a lower liftgate panel. The upper liftgate panel and the lower liftgate panel are each operable between an opened position and a closed position. A latch assembly is coupled to the lower liftgate panel and configured to selectively engage the upper liftgate panel. The latch assembly includes a shroud. A lamp assembly is coupled to the shroud. A controller is in communication with the lamp assembly. The controller activates the lamp assembly to direct light toward a ground area below the lower liftgate panel when the lower liftgate panel is in the opened position. Embodiments of the present disclosure may include one or a combination of the following features:

an upper liftgate panel includes a license plate area;

a controller activates the lamp assembly to direct light to a ground region proximate to the liftgate assembly when the lower liftgate panel is in the closed position, wherein the ground region is different than the ground area;

an imager coupled to the liftgate assembly, wherein the controller activates the lamp assembly when the imager is activated and the lower liftgate panel is in the closed position;

an intensity of the light emitted by the lamp assembly is adjusted based on a position of the lower liftgate panel;

a bumper coupled to a vehicle body proximate to the liftgate assembly, a bracket coupled to an interior of the bumper, and a lighting assembly coupled to the bracket, wherein the controller activates the lighting assembly to emit light from proximate a bottom of the bumper toward a ground area; and an ultrasonic sensor coupled to a vehicle body proximate to the lower liftgate panel, wherein the controller adjusts an intensity of the light emitted by the lamp assembly when the ultrasonic sensor senses an object within a sensor field.

According to various examples, a liftgate lighting system for a vehicle includes a liftgate assembly having a first liftgate panel and a second liftgate panel. Each of the first liftgate panel and the second liftgate panel is operable between an opened position and a closed position. The second liftgate panel has a proximal end and a distal end. A sensor proximate to the proximal end of the second liftgate panel. The sensor defines a sensor field. A lamp assembly is coupled to the second liftgate panel. A controller is communicatively coupled to the lamp assembly. The controller activates the lamp assembly and the lamp assembly directs light to a ground area proximate to the second liftgate panel when the second liftgate panel is in the opened position. Embodiments of the present disclosure may include one or a combination of the following features:

a controller adjusts an intensity of the light emitted by the lamp assembly via pulse width modulation when an object is sensed within the sensor field;

a second liftgate panel is a lower liftgate panel, wherein the sensor field extends below the second liftgate panel from proximate the proximal end and toward the distal end when the second liftgate panel is in the opened position;

a first liftgate panel includes a license plate area and the second liftgate panel includes a latch assembly, wherein the latch assembly includes a shroud, and wherein the lamp assembly is coupled to the shroud;

a bumper cover disposed proximate to the proximal end of the second liftgate panel and a lighting assembly coupled to the bumper cover, wherein the lamp assembly directs light from proximate a bottom of the bumper cover;

a second liftgate panel includes a license plate area, wherein the lamp assembly is coupled to the second liftgate panel proximate to the license plate area; and a lamp assembly includes a license plate light, a backup assist light, and a puddle light each directing light in a different direction.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine, or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A liftgate lighting system for a vehicle, comprising:
 a liftgate assembly operably coupled to a vehicle body, wherein the liftgate assembly includes:
  an upper liftgate panel; and
  a lower liftgate panel proximate to the upper liftgate panel, wherein each of the upper liftgate panel and the lower liftgate panel is operable between an opened position and a closed position;
 a lamp assembly coupled to the lower liftgate panel, wherein the lamp assembly includes at least one light source;
 a sensor coupled to the vehicle body proximate to the lower liftgate panel, wherein the sensor defines a sensor field that extends under the lower liftgate panel when the lower liftgate panel is in the opened position; and
 a controller communicatively coupled to the lamp assembly and the sensor, wherein the controller activates the lamp assembly when the sensor detects an object within the sensor field and the lower liftgate panel is in the opened position.

2. The liftgate lighting system of claim 1, wherein the at least one light source includes a license plate light that directs light to a license plate area, and wherein the at least one light source also includes a backup assist light that directs light to at least one of the license plate area and a ground area proximate said the vehicle.

3. The liftgate lighting system of claim 2, wherein the at least one light source further includes a puddle light that directs light to the ground area proximate to the liftgate assembly when the lower liftgate panel is in the opened position.

4. The liftgate lighting system of claim 2, wherein the lamp assembly includes a widening optic, wherein a light pattern emitted from the license plate light is widened by the widening optic.

5. The liftgate lighting system of claim 1, further comprising:
 a rear lamp coupled to the vehicle body proximate to the liftgate assembly, wherein a light guide extends from the rear lamp to an aperture in the vehicle body proximate to the lower liftgate panel to direct light to a ground area proximate to said vehicle.

6. The liftgate lighting system of claim 1, further comprising:
 a bumper cover coupled to the vehicle body proximate to the lower liftgate panel; and
 a lighting assembly including a bracket and a bumper light, wherein the bracket is coupled to the bumper cover, and wherein the bumper light directs light from proximate a bottom of the bumper cover.

7. A vehicle liftgate lighting system, comprising:
 a liftgate assembly having an upper liftgate panel and a lower liftgate panel, wherein the upper liftgate panel and the lower liftgate panel are each operable between an opened position and a closed position;
 a latch assembly coupled to the lower liftgate panel and configured to selectively engage the upper liftgate panel; and
 a lamp assembly coupled to the latch assembly; and
 a controller in communication with the lamp assembly, wherein the controller activates the lamp assembly to direct light toward a ground area below the lower liftgate panel when the lower liftgate panel is in the opened position.

8. The vehicle liftgate lighting system of claim 7, wherein the upper liftgate panel includes a license plate area.

9. The vehicle liftgate lighting system of claim 7, wherein the controller activates the lamp assembly to direct light to a ground region proximate to the liftgate assembly when the lower liftgate panel is in the closed position, wherein the ground region is different than the ground area.

10. The vehicle liftgate lighting system of claim 7, further comprising:
 an imager coupled to the liftgate assembly, wherein the controller activates the lamp assembly when the imager is activated and the lower liftgate panel is in the closed position.

11. The vehicle liftgate lighting system of claim 7, wherein an intensity of the light emitted by the lamp assembly is adjusted based on a position of the lower liftgate panel.

12. The vehicle liftgate lighting system of claim 7, further comprising:
 a bumper coupled to a vehicle body proximate to the liftgate assembly;
 a bracket coupled to an interior of the bumper; and
 a lighting assembly coupled to the bracket, wherein the controller activates the lighting assembly to emit light from proximate a bottom of the bumper toward a ground area.

13. The vehicle liftgate lighting system of claim 7, further comprising:
an ultrasonic sensor coupled to a vehicle body proximate to the lower liftgate panel, wherein the controller adjusts an intensity of the light emitted by the lamp assembly when the ultrasonic sensor senses an object within a sensor field.

14. A liftgate lighting system for a vehicle, comprising:
a liftgate assembly including an upper liftgate panel and a lower liftgate panel, wherein each of the upper liftgate panel and the lower liftgate panel are operable between an opened position and a closed position, wherein the lower liftgate panel has a proximal end and a distal end;
a sensor proximate to the proximal end of the lower liftgate panel, wherein the sensor defines a sensor field;
a lamp assembly coupled to the lower liftgate panel; and
a controller communicatively coupled to the lamp assembly, wherein the controller activates the lamp assembly and the lamp assembly directs light to a ground area proximate to the lower liftgate panel when the lower liftgate panel is in the opened position.

15. The liftgate lighting system of claim 14, wherein the controller adjusts an intensity of the light emitted by the lamp assembly via pulse width modulation when an object is sensed within the sensor field.

16. The liftgate lighting system of claim 14, wherein the sensor field extends below the lower liftgate panel from proximate the proximal end and toward the distal end when the lower liftgate panel is in the opened position.

17. The liftgate lighting system of claim 14, wherein the upper liftgate panel includes a license plate area and the lower liftgate panel includes a latch assembly, and wherein the lamp assembly is coupled to the latch assembly.

18. The liftgate lighting system of claim 14, further comprising:
a bumper cover disposed proximate to the proximal end of the lower liftgate panel; and
a lighting assembly coupled to the bumper cover, wherein the lamp assembly directs light from proximate a bottom of the bumper cover.

19. The liftgate lighting system of claim 14, wherein the lower liftgate panel includes a license plate area, and wherein the lamp assembly is coupled to the lower liftgate panel proximate to the license plate area.

20. The liftgate lighting system of claim 19, wherein the lamp assembly includes a license plate light, a backup assist light, and a puddle light each directing light in a different direction.

* * * * *